C. E. SNYDER.
HORSESHOE PLATE.
APPLICATION FILED FEB. 17, 1915.

1,175,829.

Patented Mar. 14, 1916.
2 SHEETS—SHEET 1.

Witnesses

Inventor
Curtis E. Snyder
By Victor J. Evans
Attorney

C. E. SNYDER.
HORSESHOE PLATE.
APPLICATION FILED FEB. 17, 1915.

1,175,829.

Patented Mar. 14, 1916.
2 SHEETS—SHEET 2.

Inventor
Curtis E. Snyder

Witnesses

By Victor J. Evans
Attorney

UNITED STATES PATENT OFFICE.

CURTIS EUGENE SNYDER, OF SOUTH VALLEY, NEW YORK.

HORSESHOE-PLATE.

1,175,829.

Specification of Letters Patent. Patented Mar. 14, 1916.

Application filed February 17, 1915. Serial No. 8,817.

*To all whom it may concern:*

Be it known that I, CURTIS E. SNYDER, a citizen of the United States, residing at South Valley, in the county of Otsego and State of New York, have invented new and useful Improvements in Horseshoe-Plates, of which the following is a specification.

This invention relates to horse shoe plates and the particular object of the invention is to provide a simple and efficient device of this character which will prevent the hoof from balling up with snow, ice or any other foreign substance and which effectively prevents the frog of the foot against injury.

Further objects of the invention will appear as the following description is read in connection with the accompanying drawing, which forms a part of this application, and in which:—

Figure 1:
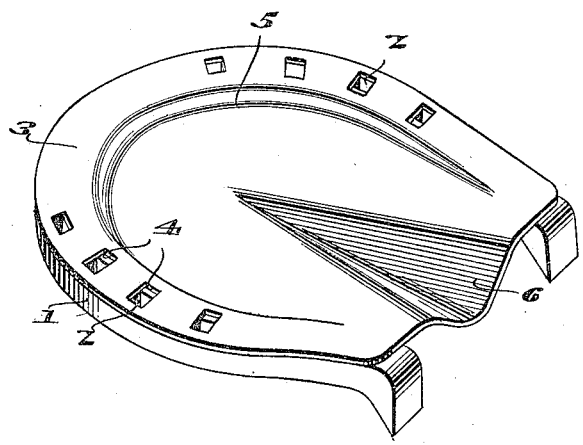
Figure 2:
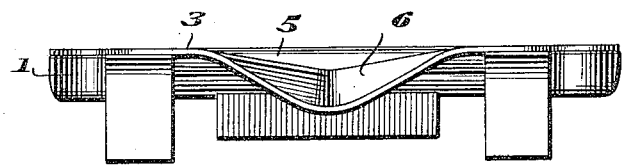
Figure 3:
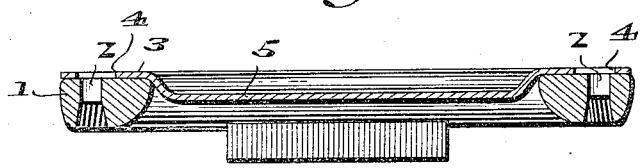
Figure 4:
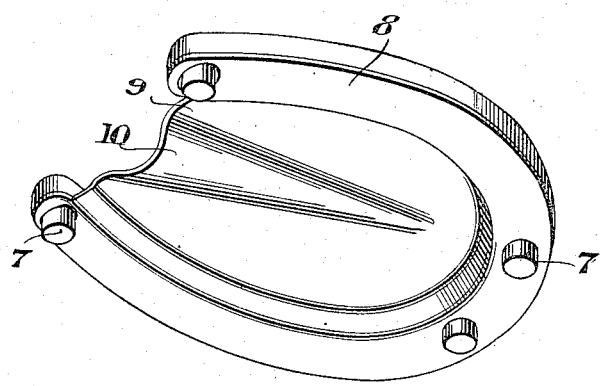
Figure 5:
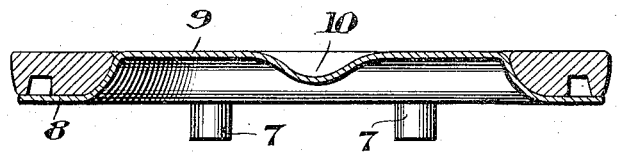
Figure 6:

Figure 1 is a perspective view showing the position of the plate upon an ordinary horse shoe. Fig. 2 is a rear elevation. Fig. 3 is a transverse section. Fig. 4 is a perspective view looking from the bottom showing a modification. Fig. 5 is a transverse sectional view through the form shown in Fig. 4. Fig. 6 is a longitudinal sectional view through the form shown in Fig. 4.

Referring more particularly to the drawing, 1 represents an ordinary horse shoe which is provided with nail holes 2 for the reception of the nails for securing the shoe to the hoof. Mounted upon the shoe so as to be interposed between the same and the hoof of the animal is a plate 3 having apertures 4 to register with the apertures 2 in the shoe and being provided with a depression 5 accentuated at the center and toward the rear of the plate, as shown at 6, to accommodate the frog of the hoof, as will be readily understood. The depression 5 forms in effect a shoulder which engages the inner wall of the shoe and prevents lateral movement of the plate on the shoe and at the same time frees the frog of the hoof from contact with the plate, as will be readily understood.

The V-shaped portion of the recess being in the form of a V-truss prevents the plate from being forced upwardly into engagement with the frog and thereby eliminates soreness which would otherwise occur should the plate be forced into contact with the frog.

In the modified forms shown in Figs. 4, 5 and 6, the plate is secured to the underside of the shoe and held in place by the calks 7. This plate is indicated as comprising a body 8 having a centrally raised portion or plateau 9 whose vertical walls are approximately the same height as the thickness of the shoe. This plateau or raised portion is provided with the depression extending longitudinally thereof indicated at 10 and is tapered from the forward portion of the shoe to the rear portion of the shoe so that the maximum depth of the depression is at the rear portion in a position to accommodate the frog of the hoof. The production of the raised portion forms a flange which is of equal width with the width of the shoe and is provided with openings as is shown in Fig. 6 for the reception of the calks and rests flatly against the bottom of the shoe, as will be readily understood.

What is claimed is:—

The combination with a horse shoe having a flat top, of a plate having a flange adapted to rest thereon, and a depression corresponding in shape with the inner margin of the shoe deepest at the front and diminishing in depth to the rear of the plate, said plate having a central longitudinal depression increasing from the medial to the rear portion thereof.

In testimony whereof I affix my signature in presence of two witnesses.

CURTIS EUGENE SNYDER.

Witnesses:
 IRVING A. BROWN,
 BYRON VAN DEMSTER.

Copies of this patent may be obtained for five cents each, by addressing the "Commissioner of Patents, Washington, D. C."